United States Patent
Kim (10) Patent No.: US 11,668,298 B2
(45) Date of Patent: Jun. 6, 2023

(54) SLIDE OF VARIABLE OIL PUMP FOR VEHICLE AND METHOD OF MANUFACTURING THE SAME

(71) Applicants: Hyundai Motor Company, Seoul (KR); Kia Motors Corporation, Seoul (KR)

(72) Inventor: Haksoo Kim, Seoul (KR)

(73) Assignees: Hyundai Motor Company, Seoul (KR); Kia Motors Cororation, Seoul (KR)

( * ) Notice: Subject to any disclaimer, the term of this patent is extended or adjusted under 35 U.S.C. 154(b) by 575 days.

(21) Appl. No.: 16/674,709

(22) Filed: Nov. 5, 2019

(65) Prior Publication Data
US 2020/0141404 A1    May 7, 2020

(30) Foreign Application Priority Data

Nov. 7, 2018 (KR) .......... 10-2018-0135875
Oct. 18, 2019 (KR) .......... 10-2019-0129621

(51) Int. Cl.
*F04C 14/18* (2006.01)
*B22F 5/10* (2006.01)
(Continued)

(52) U.S. Cl.
CPC .......... *F04C 14/18* (2013.01); *B22F 3/1007* (2013.01); *B22F 3/24* (2013.01); *B22F 5/106* (2013.01);
(Continued)

(58) Field of Classification Search
CPC .. F04C 14/18; F04C 2230/22; F04C 2240/80; F04C 2/344; F04C 14/223; F04C 2/3566;
(Continued)

(56) References Cited

U.S. PATENT DOCUMENTS 4,608,317 A * 8/1986 Kobayashi ............ B22F 1/0003
                                                        419/10
5,447,800 A    9/1995 Dorsch et al.
(Continued)

FOREIGN PATENT DOCUMENTS

CN    1662327 A    8/2005
CN    1968775 A    5/2007
(Continued)

OTHER PUBLICATIONS

Delarbre, P. and Hornof, B., Influence of the Sintering Conditions on the Properties of PM Materials, International Journal of Metallurgy and Metal Physics, p. 1-8, Apr. 30, 2018 (Year: 2018).*
(Continued)

*Primary Examiner* — Brian D Walck
*Assistant Examiner* — Danielle Carda
(74) *Attorney, Agent, or Firm* — Slater Matsil, LLP (57) ABSTRACT

A method of manufacturing a slide of a variable oil pump for a vehicle includes preparing a molded body for a slide of a variable oil pump using prealloy powder including, in percent (%) by weight of the entire composition, 0.45 to 0.55% of carbon (C), 2.8 to 3.2% of chromium (Cr), 0.45 to 0.55% of molybdenum (Mo), 0.35 to 0.5% of manganese (Mn), 0.1 to 0.25% of sulfur (S), and the remainder of iron (Fe) and inevitable impurities. A sintered body is prepared by sintering the molded body. The sintered body is slowly cooled such that a temperature of the sintered body reaches a first temperature range and rapidly cooled when the first temperature range is reached.

19 Claims, 5 Drawing Sheets

(51) Int. Cl.
  *B22F 3/24* (2006.01)
  *C21D 9/40* (2006.01)
  *C21D 6/00* (2006.01)
  *C22C 38/22* (2006.01)
  *C22C 38/04* (2006.01)
  *C22C 38/60* (2006.01)
  *F16C 17/02* (2006.01)
  *B22F 3/10* (2006.01)

(52) U.S. Cl.
  CPC .............. *C21D 6/002* (2013.01); *C21D 6/005* (2013.01); *C21D 9/40* (2013.01); *C22C 38/04* (2013.01); *C22C 38/22* (2013.01); *C22C 38/60* (2013.01); *F16C 17/02* (2013.01); *B22F 2003/248* (2013.01); *B22F 2301/35* (2013.01); *C21D 2211/008* (2013.01); *F16C 2204/64* (2013.01); *F16C 2204/70* (2013.01)

(58) Field of Classification Search
  CPC .......... B22F 3/1007; B22F 3/24; B22F 5/106; B22F 2003/248; B22F 2301/35; B22F 2998/10; B22F 3/1028; B22F 2999/00; C21D 6/002; C21D 6/005; C21D 9/40; C21D 2211/008; C21D 2211/002; C22C 38/04; C22C 38/22; C22C 38/60; C22C 33/0221; C22C 33/0207; C22C 33/0264; F16C 17/02; F16C 2204/64; F16C 2204/70; F02M 59/12
  USPC ........................................................ 75/246
  See application file for complete search history.

(56) References Cited

U.S. PATENT DOCUMENTS

| | | |
|---|---|---|
| 2006/0099105 A1 | 5/2006 | Engstrom et al. |
| 2011/0176950 A1 | 7/2011 | Unami et al. |
| 2015/0093280 A1 | 4/2015 | Szabo et al. |
| 2015/0352638 A1 | 12/2015 | Steiner et al. |
| 2017/0130669 A1* | 5/2017 | Kim .................. C21D 1/18 |
| 2018/0080104 A1 | 3/2018 | Shinohara et al. |

FOREIGN PATENT DOCUMENTS

| | | |
|---|---|---|
| CN | 102165083 A | 8/2011 |
| CN | 104039484 A | 9/2014 |
| CN | 106676397 A | 5/2017 |
| CN | 107829015 A | 3/2018 |
| JP | 2016511327 A | 4/2016 |
| KR | 100966266 B1 | 6/2010 |
| KR | 101063380 B1 | 9/2011 |
| WO | 2009030291 A1 | 3/2009 |
| WO | 2009113821 A2 | 9/2009 |

OTHER PUBLICATIONS

Narasimhan, Kalathur, Sintering of powder mixtures and the growth of ferrous powder metallurgy, Materials Chemistry and Physics, Jan. 2001 (Year: 2001).*

ASM Handbook, Powder Metallurgy Methods and Applications, vol. 7 (Year: 2015).*

* cited by examiner

SLIDE OF VARIABLE OIL PUMP FOR VEHICLE AND METHOD OF MANUFACTURING THE SAME

CROSS-REFERENCE TO RELATED APPLICATIONS

This application claims priority to Korean Patent Application No. 10-2018-0135875, filed on Nov. 7, 2018, and to Korean Patent Application No. 10-2019-0129621, filed on Oct. 18, 2019, which applications are hereby incorporated herein by reference.

TECHNICAL FIELD

The present disclosure relates to an oil pump of a vehicle.

BACKGROUND

The oil pressure required by an engine varies according to revolutions per minute (RPM). In general, the oil pressure is represented in a parabolic shape. However, the existing oil pump provides an oil pressure in the form of a straight line, which causes a loss in the fuel efficiency of about 2%.

Recently, in order to improve the fuel efficiency, variable oil pumps have been increasingly adopted that may control the amount of oil flowing into a pump. The variable oil pump is a device for generating oil pressure by a vane or pendulum, formed of high chrome (Cr) based material, coming into contact with a slide inner diameter. For the wear resistance of a slide, the variable oil pump is subject to steam treatment or nitration treatment, but the steam layer/nitration layer is peeled off during a line-fault evaluation, whereby a method of coping with severe conditions is required.

SUMMARY

Embodiments of the present disclosure can provide a slide of a variable oil pump for a vehicle capable of improving dimension precision using prealloy powder and an improved sinter hardening method. A method of manufacturing the slide is also disclosed.

Additional aspects of the invention will be set forth in part in the description which follows and, in part, will be obvious from the description, or may be learned by practice of the invention.

In accordance with one aspect of the present disclosure, a method of manufacturing a slide of a variable oil pump for a vehicle includes preparing a molded body for a slide of a variable oil pump using prealloy powder including, in percent (%) by weight of the entire composition, 0.45 to 0.55% of carbon (C), 2.8 to 3.2% of chromium (Cr), 0.45 to 0.55% of molybdenum (Mo), 0.35 to 0.5% of manganese (Mn), 0.1 to 0.25% of sulfur (S), and the remainder of iron (Fe) and inevitable impurities. A sintered body is prepared by sintering the molded body. The sintered body is slowly cooled such that a temperature of the sintered body reaches a first temperature range and rapidly cooled when the first temperature range is reached.

The cooling of the sintered body slowly such that the temperature of the sintered body reaches the first temperature range may include performing a furnace cooling on the sintered body such that the temperature of the sintered body reaches a range of 830 to 870° C.

The cooling of the sintered body rapidly when the first temperature range is reached may include cooling the sintered body such that the temperature of the sintered body reaches a range of 200 to 350° C. at a cooling rate of 2 to 3° C./s when the first temperature range is reached.

The preparing of the sintered body by sintering the molded body may include preparing the sintered body by sintering the molded body at a sintering temperature of 1110 to 1160° C. for 25 to 35 minutes.

The preparing of the sintered body by sintering the molded body may include preparing the sintered body using gas in which nitrogen gas is mixed with hydrogen gas in a nitrogen-to-hydrogen ratio of 8:2-9:1.

The sintered body may have an overall density of 6.85 to 6.95 g/cm$^3$.

In accordance with another aspect of the present disclosure, a slide of a variable oil pump for a vehicle includes, in percent (%) by weight of the entire composition, 0.45 to 0.55% of carbon (C), 2.8 to 3.2% of chromium (Cr), 0.45 to 0.55% of molybdenum (Mo), 0.35 to 0.5% of manganese (Mn), 0.1 to 0.25% of sulfur (S), and the remainder of iron (Fe) and inevitable impurities, and a tempered Martensite as a microstructure.

The slide may further include 5% or less of a bainite at a core as a micro structure.

The slide may have a surface hardness of Hv0.3 550 or higher.

In accordance with another aspect of the present disclosure, a variable oil pump includes a rotor, a plurality of vanes inserted into a plurality of radiation channels formed in the rotor, and the slide configured to vary a pumping volume by pressing the vanes during rotational movement.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION OF ILLUSTRATIVE EMBODIMENTS

Like numerals refer to like elements throughout the specification. Not all elements of embodiments of the present disclosure will be described, and description of what are commonly known in the art or what overlap each other in the embodiments will be omitted.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

As used herein, the singular forms "a," "an" and "the" are intended to include the plural forms as well, unless the context clearly indicates otherwise.

Hereinafter, embodiments of the present disclosure will be described in detail with reference to the accompanying drawings and tables.

Figure 1:
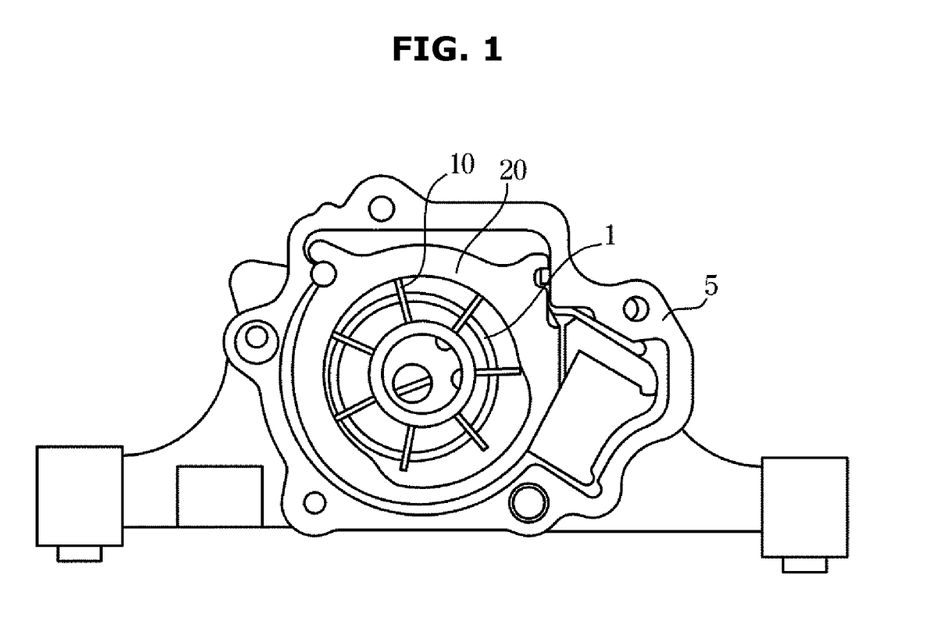
FIG. 1 is a diagram illustrating a slide of a variable oil pump for a vehicle.

FIG. 1 is a diagram illustrating a slide of a variable oil pump for a vehicle.

Referring to FIG. 1, the variable oil pump includes a rotor 1 rotating together with a rotating shaft for transmitting power; a plurality of vanes 10 inserted into a plurality of radiation channels formed in the rotor 1 and moving in a radial direction; a slide 20 configured to vary a pumping volume by pressing the vanes 10 during rotational movement; and a housing 5.

The slide according to the disclosed embodiment may be manufactured by a sinter hardening method. In general, materials for sinter hardening, e.g., mixed powder, are subject to a sinter hardening process, and then subject to a machining process or surface treatment for the exterior shape of the sinter-hardened materials.

The machining process is an operation for correcting the dimensions of a product by applying a press load of plastic zone to the exterior shape.

The surface treatment operation is an operation for removing burr or improving the surface quality by applying a press load of elastic zone to the exterior shape, rather than not for correcting the dimensions. In this case, the molding pressure per area ($cm^2$) may be 6 to 7 tons.

A complex shape, such as a slide, has a cooling speed varying from portion to portion due to size effect, and thus suffers from shrinkage and expansion due to martensite transformation, which results in a great change in the outer dimensions, and requires a machining process. However, since a load for correcting the shape is high due to the high strength of the slide, mold breakage and the like may occur. In addition, since the amount of springback is large, the sizing effect is insignificant, so there is a case that the main dimension should be adjusted by a cutting process. In addition, since the above-described slide of the variable oil pump has an asymmetrical shape and a high degree of dimensionality, it is difficult to control dimensions through a general sinter hardening process.

The disclosed embodiment provides a method of manufacturing a slide of a variable oil pump for a vehicle, in which microstructures having an excellent wear resistance are obtained and dimensional change is minimized through an improved sinter hardening method.

Figure 2A:
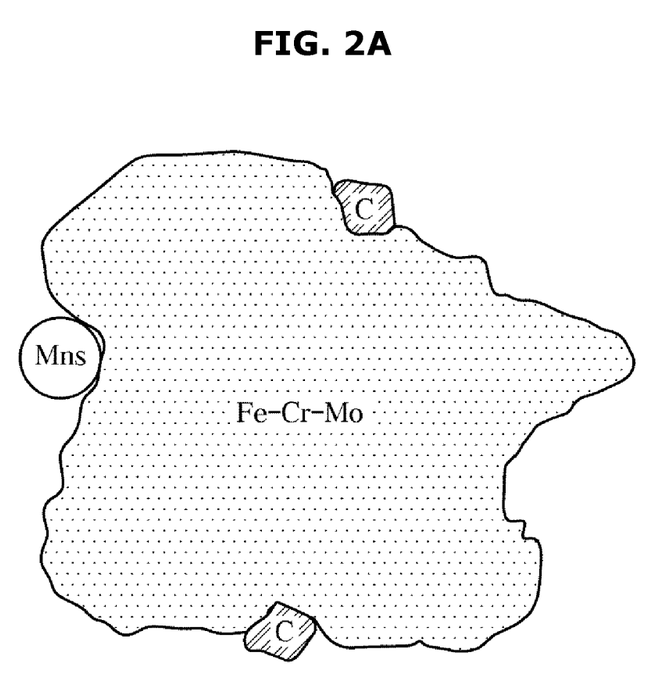
FIG. 2A is a conceptual diagram illustrating a prealloy according to the disclosed embodiment.
Figure 2B:
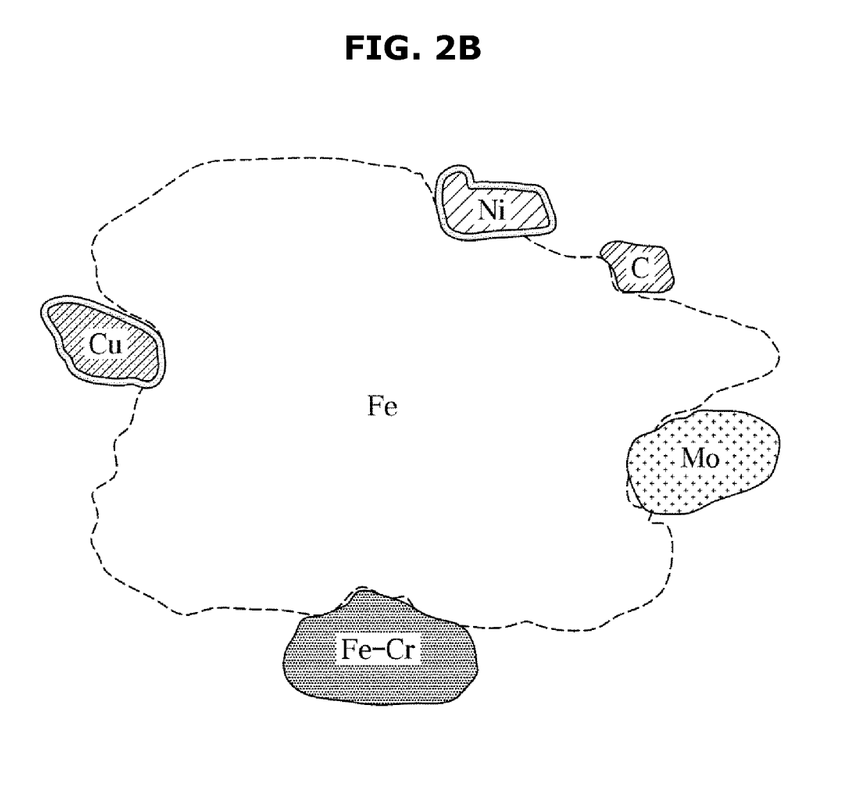
FIG. 2B is a conceptual diagram illustrating mixed powder.

First, the slide according to the disclosed embodiment uses prealloy powder to increase the dimensional precision of the exterior shape such that the machining process is omitted. FIG. 2A is a conceptual diagram illustrating a prealloy according to the disclosed embodiment, and FIG. 2B is a conceptual diagram illustrating mixed powder.

The prealloy powder according to the disclosed embodiment includes, in percent (%) by weight of the entire composition, 0.45 to 0.55% of carbon (C), 2.8 to 3.2% of chromium (Cr), 0.45 to 0.55% of molybdenum (Mo), 0.35 to 0.5% of manganese (Mn), 0.1 to 0.25% of sulfur (S), and the remainder of iron (Fe) and inevitable impurities.

When the above-described elements do not reach the corresponding component ranges, a great dimensional change occurs primarily, and a hardness value of Hv3.0 550 or higher is not provided. In addition, when the above-described elements exceed the component ranges, moldability deteriorates and thus the overall density does not reach a target level, for example, 6.9.

Prealloy powder has alloying components more homogeneous than those of general sinter hardening powder, and thus has a small dimensional change in a rapid-cooling process. Referring to FIG. 2A, it can be seen that the prealloy powder according to the disclosed embodiment has a Cr—Mo component or a Ni—Mo component homogeneously distributed in Fe powder.

For example, in the prealloy powder, the content of the Cr—Mo component is determined in a molten state. According to the present disclosure, the Cr component in a moltent state has a content in a range of 2.95 to 3.05%, and the Cr component in a powder state has a content in a range of 2.8 to 3.2% with a deviation of 5%.

However, referring to FIG. 2B, the mixed powder has Cr, Mo, Ni, Cu, and C components adjacent to the iron powder surface by mixing, or diffused into some Fe base, in which the alloying components (Ni, Cu, Mo, Cr, etc.) are difficult to be uniformly diffused in the Fe base even after sintering, forming a mixed structure during slow cooling. If the sintering temperature is maintained at 1200° C. or higher for a long time, the alloying components may be uniformly diffused into the Fe powder, but shrinkage or expansion according to the type of alloy occurs, which causes difficulty controlling the dimensions.

The prealloy powder according to the disclosed embodiment has alloying elements completely diffused before the sintering, and forms a single structure during slow cooling, so that the dimensional change after sintering is significantly small.

On the other hand, the higher the overall density, the larger the dimensional change before and after sintering, so the overall density of the molded body or the sintered body is limited to 6.85 to 6.95 $g/cm^3$ to predict the dimensional change stably. Here, the overall density refers to a density value measured without cutting a part.

In the method of manufacturing the slide of the variable oil pump for the vehicle according to the disclosed embodiment, the prealloy powder having the above described component ranges is molded into a slide shape, and the slide molded body is sintered to form a slide sintered body.

Figure 3A:
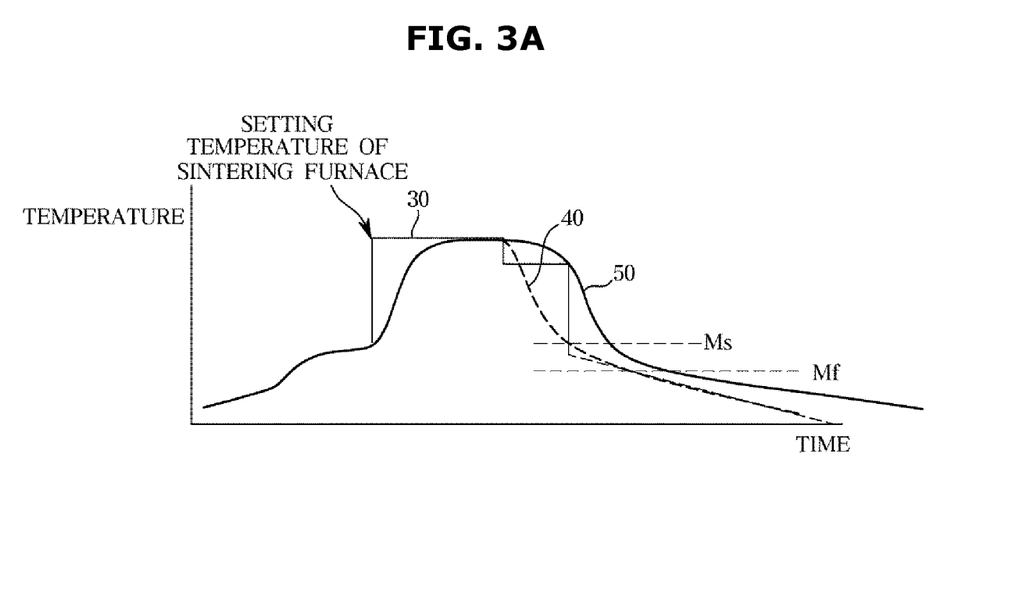
FIGS. 3A and 3B are graphs showing temperature change of a sintering process and a cooling process according to the disclosed embodiment.
Figure 3B:
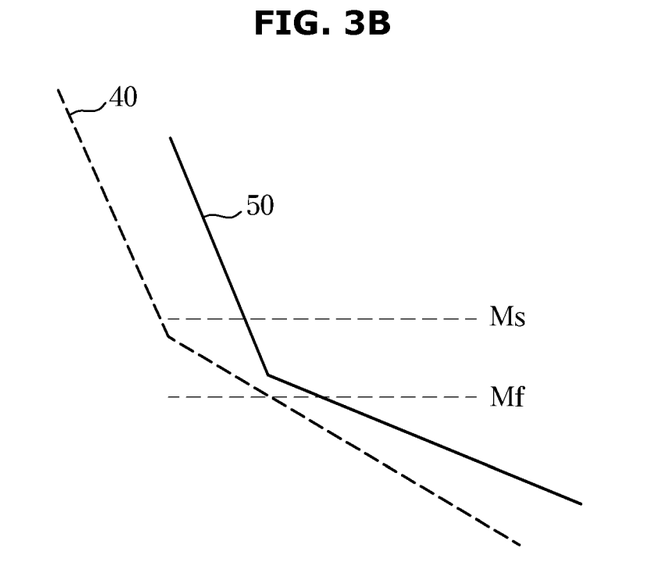

FIGS. 3A and 3B are graphs showing temperature change of a sintering process and a cooling process according to the disclosed embodiment.

As described above, the dimensional precision may be improved using the prealloy powder, and the dimensional precision may be further improved using the sinter hardening method according to the disclosed embodiment.

Referring to FIG. 3A, according to the disclosed embodiment 30, a molded body formed of prealloy powder is sintered in a sintering furnace that is set to a temperature range of 1110 to 1160° C. According to an exemplary embodiment, the sintering is performed at a temperature around 1120° C. for 25 to 35 minutes, and as the sintering gas, a gas in which nitrogen gas is mixed with hydrogen gas in a nitrogen-to-hydrogen ratio of 8:2-9:1 is used.

According to the disclosed embodiment 50, the above-described sintering process is not immediately followed by a rapid-cooling, unlike the existing sinter hardening method according to a comparative example 40, but a slow-cooling is performed on the sintered body until the temperature thereof reaches a temperature range of 830 to 870° C. through a furnace cooling. When the temperature of the sintered body reaches the temperature range 830 to 870° C., the sintered body is cooled at a cooling rate of 2 to 3° C./s to 200 to 350° C. (Mf point).

Such a slow-cooling is performed to further refine an austenite structure that is made coarse through the sintering process performed at a temperature around 1120° C., and to reduce the cooling time using blowing. Since the cooling capacity in a cooling blowing section is limited, when cooling is started at a lower temperature than with the comparative example, the cooling time is shortened, which enables the surface of the sintered body to be rapidly cooled to a level approximating the Mf temperature, whereby the dimensional change is reduced to within 0.1%, improving the dimensional precision.

In general, an abrupt temperature inflection section exists between the Ms temperature and the Mf temperatures during cooling, and thus the time for passing through the Mf temperature section after the Ms temperature depends on the cooling start temperature. As in the disclosed embodiment 50, when cooling is started at a temperature lowered by about 200 to 250° C. with respect to the sintering temperature, martensite transformation easily occurs and residual austenite formation is suppressed.

On the other hand, after the Mf temperature, the cooling rate is slowed down by the latent heat of a core portion of the sintered body, and thus the time for which the rapidly-cooled structure of the surface portion of the sintering body is exposed in the section of 150 to 250° C. is increased to one hour or more, so that the tempering effect may be obtained. Accordingly, a separate tempering process may be omitted or reduced. Similar to the machining process, the tempering is not a compulsory process. As needed, the tempering may be performed for one hour in a temperature range of 180 to 220° C.

On the other hand, when the cooling rate is 2.4 to 3.0° C./s immediately after the sintering, a tempered martensite structure is formed over the entire slide, and when the cooling rate is 2.0 to 2.4° C./s, a tempered martensite structure and a bainite structure of less than 5% are formed in the core.

As described above, the sintered body is formed of the prealloy powder, and after the sintering, the sintered body is not immediately subject to a rapid-cooling process but subject to an slow-cooling process and then subsequently subject to a rapid-cooling process, so that the dimensional precision may be improved and the machining process of the exterior shape may be omitted.

The slide manufactured through the above-described process may implement a surface hardness of Hv0.3 550 or higher, and more specifically, as shown in Table 1 below, implement a surface hardness of Hv0.3 650.

Table 1 below shows data of an exemplary embodiment and comparative examples.

TABLE 1

| Item | | Exemplary embodiment | Comparative example 1 | Comparative example 2 | Comparative example 3 |
|---|---|---|---|---|---|
| Composition, wt % | | 2.95Cr—0.5Mo—0.5C | 2.95Cr—0.5Mo—0.5C | 2.95Cr—0.5Mo—0.5C | 2.95Cr—0.5Mo—0.7C |
| Overall density, g/cm³ | | 6.9 | 6.9 | 6.8 | 6.9 |
| Molding pressure, ton | | 90 | 90 | 80 | 90 |
| Cooling start temp. ° C. | | 850 | 1120 | 850 | 850 |
| Outer Diameter D/C = Sintered article/Molded article | Cooling, 2° C./S | 0.9997 | 0.9993 | 0.9990 | 0.9992 |
| | Cooling, 2.5° C./s | 0.9998 | 0.9992 | 0.9989 | 0.9994 |
| Hardness HRC | Cooling, 2° C./S | 33 | 34 | 30 | 35 |
| | Cooling, 2.5° C./s | 41 | 43 | 38 | 42 |
| Surface hardness Hvo.3, avg. | | 650 | 607 | 556 | 548 |
| Note | | Embodiment of the disclosure | Existing sinter hardening method | Overall density decreased - Rate of dimension change (large) | Carbon added Residue Austenitic formed - Formation of lower micro hardness portion on surface portion Rate of dimension change (large) |

| Item | Comparative example 4 | Comparative example 5 | Comparative example 6 |
|---|---|---|---|
| Composition, wt % | 2.95Cr—0.5Mo—0.35C | 2.95Cr—0.5Mo—0.45C | 2.5Cr—0.25Mo—0.5C |
| Overall density, g/cm³ | 6.9 | 7.0 | 6.9 |
| Molding pressure, ton | 90 | 105 | 83 |
| Cooling start temp. ° C. | 850 | 850 | 850 |

TABLE 1-continued

| | | | | |
|---|---|---|---|---|
| Outer Diameter | Cooling, 2° C./S | 1.0025 | 1.0006 | 0.9985 |
| D/C Sintered article/Molded article | Cooling, 2.5° C./s | 1.0027 | 1.0008 | 0.9989 |
| Hardness HRC | Cooling, 2° C./S | 27 | 35 | 20 |
| | Cooling, 2.5° C./s | 32 | 43 | 25 |
| Surface hardness Hvo.3, avg. | | 358 | 659 | 367 |
| Note | | Carbon reduced Formation of Bainite - Rate of dimension change (large) | Overall density increased - Mold breakage Rate of dimension change (large) | CR, Mo below content - Rate of dimension change (large) |

The comparative example 1 represents the conventional sinter hardening method in which the sintering is not immediately followed by the slow-cooling, the comparative example 2 has a low overall density, the comparative example 5 has a high overall density, and other comparative examples have different component ranges. When compared to the comparative examples, it can be seen that a cooling at a cooling rate of 2.5° C./s allows the comparative examples to have a larger change in the slide outer diameter than with the embodiment of the present disclosure. When the tolerance for a slide outer diameter dimension change is within ±0.03, a product failing to meet the outer diameter dimension standards needs to be machined. When the rates of dimension change of the comparative examples are converted into outer diameter dimensions, and the standard of the outer diameter dimension is Φ65±0.03, the comparative example 1 provides an outer diameter dimension of 64.948, the comparative example 2 provides an outer diameter dimension of 64.928, the comparative example 5 provides an outer diameter dimension of 65.052, and the exemplary embodiment provides an outer diameter dimension of 64.987. That is, only the exemplary embodiment has a result that falls within the tolerance range of ±0.03 with respect to the outer diameter dimension of 65, so that the machining process can be omitted.

Figure 4:
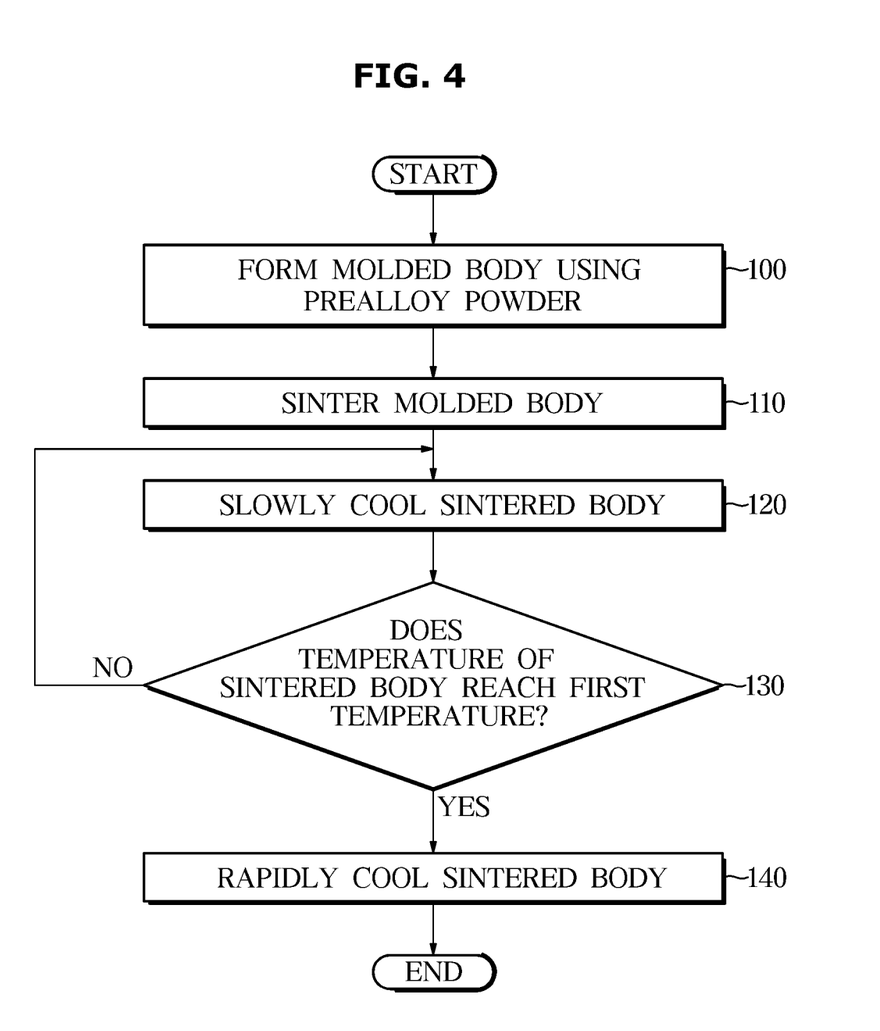
FIG. 4 is a flowchart showing a method of manufacturing a slide of a variable oil pump for a vehicle according to the disclosed embodiment.

FIG. 4 is a flowchart showing a method of manufacturing a slide of a variable oil pump for a vehicle according to the disclosed embodiment. Hereinafter, the method of manufacturing a slide of a variable oil pump for a vehicle according to the disclosed embodiment will be described with reference to FIG. 4.

Referring to FIG. 4, a molded body is formed using prealloy powder (100), the molded body is sintered (110), the sintered body is slowly cooled (120), and when the temperature of the sintered body reaches a first temperature range (130), the sintered body is rapidly cooled (140).

The prealloy powder according to the disclosed embodiment may include, in percent (%) by weight of the entire composition, 0.45 to 0.55% of carbon (C), 2.8 to 3.2% of chromium (Cr), 0.45 to 0.55% of molybdenum (Mo), 0.35 to 0.5% of manganese (Mn), 0.1 to 0.25% of sulfur (S), and the remainder of iron (Fe) and inevitable impurities.

The prealloy powder has the alloying components more homogeneous than those of general sinter hardening powder, and thus has a smaller dimensional change in the rapid-cooling. Referring to FIG. 2A, it can be seen that the prealloy powder according to the disclosed embodiment has a Cr—Mo component or a Ni—Mo component homogeneously distributed in Fe powder. The prealloy powder according to the disclosed embodiment has the alloying elements completely diffused even before the sintering, and thus forms a single structure during slow cooling, so that the dimensional change after sintering is significantly small.

In the method of manufacturing the slide of the variable oil pump for the vehicle, the prealloy powder having the above described component ranges is molded into a slide shape, and the slide molded body is sintered to form a slide sintered body.

In the disclosed embodiment, referring to FIG. 3, the molded body formed of the prealloy powder is sintered in a sintering furnace set to a temperature range of 1110 to 1160° C. According to an exemplary embodiment, the sintering is performed at a temperature around 1120° C. for 25 to 35 minutes. As the sintering gas, a gas in which nitrogen gas is mixed with hydrogen gas in a nitrogen-to-hydrogen ratio of 8:2-9:1 is used. In addition to the above-described mixed gas, hydrogen gas may be used as the sintering gas, and the sintering may be performed even under vacuum without sintering gas.

When the above-described sintering process is completed, the sintered body is slowly cooled by furnace cooling until the temperature of the sintered body reaches a temperature range of 830 to 870° C. When the temperature range of 830 to 870° C. is reached, the sintered body is cooled to 200 to 350° C. (Mf point) at a cooling rate of 2.0 to 3.0° C./s.

Such a slow cooling is performed to further refine an austenite structure that is made coarse through the sintering process performed at a temperature around 1120° C., and to reduce the cooling time using blowing. Since the cooling capacity in a cooling blowing section is limited, when cooling is started at a lower temperature than with the comparative example, the cooling time is shortened, which enables the surface of the sintered body to be rapidly cooled to a level approximating the Mf temperature, whereby the dimensional change is reduced to within 0.1%, improving the dimensional precision.

On the other hand, after the Mf temperature, the cooling rate is slowed down due to the latent heat of a core portion of the sintered body, and thus the time for which the rapidly-cooled structure of the surface portion of the sintering body is exposed in the section of 150 to 250° C. is increased to one hour or more, so that the tempering effect may be obtained. Accordingly, a separate tempering process may be omitted or reduced. As described above, the sintered body is formed of the prealloy powder, and after the sinter, the sintered body is not immediately subject to a rapid-cooling process but subject to a slow-cooling process and then subsequently subjected to a rapid-cooling process, so that the dimensional precision may be improved and the machining process of the exterior shape may be omitted.

As is apparent from the above, the method of manufacturing the slide of the variable oil pump for the vehicle can improve the wear resistance and the outer dimension precision, so that a separate machining process for dimension correction can be omitted.

In addition, the cooling section is shortened, so that self-tempering can be performed only with the own latent heat.

Although embodiments of the disclosure have been described with reference to the accompanying drawings, a person having ordinary skilled in the art will appreciate that other specific modifications can be easily made without departing from the technical spirit or essential features of the disclosure. Therefore, the foregoing embodiments should be regarded as illustrative rather than limiting in all aspects.

What is claimed is:

1. A method of manufacturing a slide of a variable oil pump for a vehicle, the method comprising:
   preparing a molded body for the slide of the variable oil pump using prealloy powder consisting of, in percent (%) by weight of the entire composition, 0.45 to 0.55% of carbon (C), 2.8 to 3.2% of chromium (Cr), 0.45 to 0.55% of molybdenum (Mo), 0.35 to 0.5% of manganese (Mn), 0.1 to 0.25% of sulfur (S), and the remainder of iron (Fe) and inevitable impurities;
   preparing a sintered body by sintering the molded body;
   slowly cooling the sintered body such that a temperature of the sintered body reaches a first temperature range of 830 to 870° C. through a furnace cooling; and
   rapidly cooling the sintered body such that the temperature of the sintered body reaches a range of 200 to 350° C. at a cooling rate of 2 to 3° C./s when the first temperature range is reached, the rapidly cooling being performed at a faster rate than the slowly cooling; and
   exposing a rapidly-cooled structure of a surface portion of the sintered body for more than 1 hour in a section of 150 to 250° C. at a slow cooling rate, wherein the sintered body has an overall density of 6.85 to 6.95 g/cm³.

2. The method of claim 1, wherein preparing the sintered body comprises preparing the sintered body by sintering the molded body at a sintering temperature of 1110 to 1160° C. for 25 to 35 minutes.

3. The method of claim 2, wherein preparing of the sintered body comprises preparing the sintered body using gas in which nitrogen gas is mixed with hydrogen gas in a nitrogen-to-hydrogen ratio of 8:2-9:1.

4. The method of claim 1, wherein preparing of the sintered body comprises preparing the sintered body using gas in which nitrogen gas is mixed with hydrogen gas in a nitrogen-to-hydrogen ratio of 8:2-9:1.

5. The method of claim 1, wherein the slide of the variable oil pump manufactured by the method comprises:
   in percent (%) by weight of the entire composition, 0.45 to 0.55% of carbon (C), 2.8 to 3.2% of chromium (Cr), 0.45 to 0.55% of molybdenum (Mo), 0.35 to 0.5% of manganese (Mn), 0.1 to 0.25% of sulfur (S), and the remainder of iron (Fe) and inevitable impurities; and
   a tempered Martensite as a microstructure.

6. The method of claim 5, wherein the slide further comprises 5% or less of a bainite at a core as the microstructure.

7. The method of claim 5, wherein the slide has a surface hardness of Hv0.3 550 or higher.

8. A method of manufacturing a slide of a variable oil pump for a vehicle, the method comprising:
   preparing a molded body for the slide of the variable oil pump using prealloy powder consisting of, in percent (%) by weight of the entire composition, 0.45 to 0.55% of carbon (C), 2.8 to 3.2% of chromium (Cr), 0.45 to 0.55% of molybdenum (Mo), 0.35 to 0.5% of manganese (Mn), 0.1 to 0.25% of sulfur (S), and the remainder of iron (Fe) and inevitable impurities;
   sintering the molded body to form a sintered body, wherein the sintered body has an overall density of 6.85 to 6.95 g/cm³;
   performing a furnace anneal to cool the sintered body such that a temperature of the sintered body reaches a temperature between 830 and 870° C.;
   when the temperature between 830 and 870° C. is reached, rapidly cooling the sintered body such that the sintered body reaches a range of 200 to 350° C. at a cooling rate of 2 to 3° C./s, the rapidly cooling being performed at a faster rate than the furnace anneal cooling; and
   exposing a rapidly-cooled structure of a surface portion of the sintered body for more than one hour in a section of 150 to 250° C. at a slow cooling rate.

9. The method of claim 8, wherein sintering the molded body comprises sintering the molded body at a sintering temperature of 1110 to 1160° C. for 25 to 35 minutes.

10. The method of claim 9, wherein sintering the molded body comprises sintering the molded body using gas in which nitrogen gas is mixed with hydrogen gas in a nitrogen-to-hydrogen ratio of 8:2-9:1.

11. The method of claim 8, wherein sintering the molded body comprises sintering the molded body using gas in which nitrogen gas is mixed with hydrogen gas in a nitrogen-to-hydrogen ratio of 8:2-9:1.

12. The method of claim 8, wherein the slide of the variable oil pump manufactured by the method comprises:
   in percent (%) by weight of the entire composition, 0.45 to 0.55% of carbon (C), 2.8 to 3.2% of chromium (Cr), 0.45 to 0.55% of molybdenum (Mo), 0.35 to 0.5% of manganese (Mn), 0.1 to 0.25% of sulfur (S), and the remainder of iron (Fe) and inevitable impurities; and
   a tempered Martensite as a microstructure.

13. The method of claim 12, wherein the slide further comprises, by an area fraction, 5% or less of a bainite at a core as the microstructure.

14. The method of claim 13, wherein the slide has a surface hardness of Hv0.3 550 or higher.

15. The method of claim 12, wherein the slide has a surface hardness of Hv0.3 550 or higher.

16. A method of manufacturing a variable oil pump for a vehicle, the method comprising:
   manufacturing a slide by:
      preparing a molded body for the slide of the variable oil pump using prealloy powder consisting of, in percent (%) by weight of the entire composition, 0.45 to 0.55% of carbon (C), 2.8 to 3.2% of chromium (Cr), 0.45 to 0.55% of molybdenum (Mo), 0.35 to 0.5% of manganese (Mn), 0.1 to 0.25% of sulfur (S), and the remainder of iron (Fe) and inevitable impurities;
      preparing a sintered body by sintering the molded body;

slowly cooling the sintered body such that a temperature of the sintered body reaches a first temperature range of 830 to 870° C. through a furnace cooling;

rapidly cooling the sintered body such that the temperature of the sintered body reaches a range of 200 to 350° C. at a cooling rate of 2 to 3° C./s when the first temperature range is reached, the rapidly cooling being performed at a faster rate than the slowly cooling, wherein the sintered body has an overall density of 6.85 to 6.95 g/cm$^3$; and exposing a rapidly-cooled structure of a surface portion of the sintered body for more than 1 hour in a section of 150 to 250° C. at a slow cooling rate;

inserting a plurality of vanes into a plurality of radiation channels formed in a rotor; and arranging the slide with the rotor so that the slide is capable of varying a pumping volume by pressing the vanes during rotational movement.

17. The method of claim 16, wherein preparing the sintered body comprises preparing the sintered body by sintering the molded body at a sintering temperature of 1110 to 1160° C. for 25 to 35 minutes.

18. The method of claim 17, wherein preparing of the sintered body comprises preparing the sintered body using gas in which nitrogen gas is mixed with hydrogen gas in a nitrogen-to-hydrogen ratio of 8:2-9:1.

19. The method of claim 16, wherein preparing of the sintered body comprises preparing the sintered body using gas in which nitrogen gas is mixed with hydrogen gas in a nitrogen-to-hydrogen ratio of 8:2-9:1.

* * * * *

UNITED STATES PATENT AND TRADEMARK OFFICE
CERTIFICATE OF CORRECTION

| | |
|---|---|
| PATENT NO. | : 11,668,298 B2 |
| APPLICATION NO. | : 16/674709 |
| DATED | : June 6, 2023 |
| INVENTOR(S) | : Haksoo Kim |

It is certified that error appears in the above-identified patent and that said Letters Patent is hereby corrected as shown below:

On the Title Page

Item (73), in Column 1, in "Assignees", Line 2, delete "Cororation," and insert -- Corporation, --, therefor.

Signed and Sealed this
Eighth Day of August, 2023

Katherine Kelly Vidal
*Director of the United States Patent and Trademark Office*